(12) United States Patent
Rehman et al.

(10) Patent No.: US 11,162,919 B2
(45) Date of Patent: Nov. 2, 2021

(54) ULTRASONIC BASED INTERNAL INSPECTION OF TUBES

(71) Applicant: Saudi Arabian Oil Company, Dhahran (SA)

(72) Inventors: Aziz U. Rehman, Dhahran (SA); Taher L. Al-Jundi, Dhahran (SA); Mansour M. Al-Ajji, Dhahran (SA); Isa H. Al-Mudaibegh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 246 days.

(21) Appl. No.: 16/417,172

(22) Filed: May 20, 2019

(65) Prior Publication Data

US 2020/0371068 A1    Nov. 26, 2020

(51) Int. Cl.
*G01N 29/07* (2006.01)
*G01N 29/24* (2006.01)
(Continued)

(52) U.S. Cl.
CPC .......... *G01N 29/265* (2013.01); *G01N 29/07* (2013.01); *G01N 29/24* (2013.01); *G01N 29/44* (2013.01);
(Continued)

(58) Field of Classification Search
CPC .... G01N 29/265; G01N 29/07; G01N 29/225; G01N 29/262; G01N 29/24; G01N 29/44;
(Continued)

(56) References Cited

U.S. PATENT DOCUMENTS

| 4,473,921 A | * | 10/1984 | Weber | .................... B08B 9/035 |
|---|---|---|---|---|
| | | | | 15/104.09 |
| 4,641,529 A | | 2/1987 | Lorenzi et al. | |

(Continued)

FOREIGN PATENT DOCUMENTS

| CN | 107843649 | 3/2018 |
|---|---|---|
| EP | 304053 | 2/1989 |

(Continued)

OTHER PUBLICATIONS

PCT International Search Report and Written Opinion in International Appln. No. PCT/US2020/033550, dated Aug. 4, 2020, 25 pages.

(Continued)

*Primary Examiner* — Jacques M Saint Surin
(74) *Attorney, Agent, or Firm* — Fish & Richardson P.C.

(57) ABSTRACT

A sensor assembly communicatively coupled to a processing device is configured to be disposed within and move along a pipe configured to flow a fluid. The sensor assembly includes a tubular housing configured to be centrally retained within the pipe. The tubular housing includes an outer diameter smaller than an internal diameter of the pipe. The sensor assembly also includes a plurality of ultrasonic elements coupled to and distributed evenly along an external surface of the tubular housing to define a gap between an outer surface of the ultrasonic elements and an internal surface of the pipe. The ultrasonic elements are configured to transmit ultrasonic signals and sense ultrasonic signals reflected from the internal surface of the pipe to sense corrosion and scale buildup information inside the pipe. The ultrasonic elements are configured to transmit the information to the processing device.

22 Claims, 9 Drawing Sheets

(51) Int. Cl.
*G01N 29/44* (2006.01)
*G01N 29/265* (2006.01)

(52) U.S. Cl.
CPC ............. *G01N 2291/02416* (2013.01); *G01N 2291/106* (2013.01); *G01N 2291/2636* (2013.01)

(58) Field of Classification Search
CPC ....... G01N 29/043; G01N 2291/02416; G01N 2291/106; G01N 2291/2636; G01N 2291/0258
USPC .......................................................... 73/592
See application file for complete search history.

(56) References Cited

U.S. PATENT DOCUMENTS

| | | | | |
|---|---|---|---|---|
| 4,964,059 | A * | 10/1990 | Sugaya | G01N 29/07 702/38 |
| 6,388,439 | B1 * | 5/2002 | Lembeye | G01N 27/902 324/220 |
| 7,617,603 | B2 | 11/2009 | Coleman et al. | |
| 7,798,023 | B1 * | 9/2010 | Hoyt | F16L 55/28 73/865.8 |
| 9,804,132 | B2 * | 10/2017 | Hoyt | G01N 27/83 |
| 10,060,567 | B2 * | 8/2018 | Van Nie | G01N 29/043 |
| 10,458,822 | B2 * | 10/2019 | Pirner | F16L 55/00 |
| 10,527,588 | B2 * | 1/2020 | Torichigai | G01N 29/265 |
| 2003/0136195 | A1 | 7/2003 | Krieg et al. | |
| 2007/0239968 | A1 * | 10/2007 | Moyer | G06F 9/30101 712/221 |
| 2008/0178679 | A1 | 7/2008 | Hirao et al. | |
| 2008/0184784 | A1 * | 8/2008 | Dam | G01N 29/222 73/61.75 |
| 2016/0327419 | A1 * | 11/2016 | Hellevang | G01F 1/74 |

FOREIGN PATENT DOCUMENTS

| | | |
|---|---|---|
| JP | H08188151 | 7/1996 |
| JP | 2013170845 | 9/2013 |
| WO | 9931499 | 6/1999 |

OTHER PUBLICATIONS ccj-online.com [online], "HRSG Inspection Tools," available on or before Feb. 25, 2019, retrieved on May 22, 2019, retrieved from URL <www.ccj-online.com/wp-content/uploads/gravity_forms/3-b246f63cf9a9ff5af247a3db291cb13f/2016/05/HRSG-NDT-Brochure.pdf>.

Swanekamp, "HRSG Inspectors," Power Engineering, retrieved from URL <https://www.power-eng.com/articles/print/volume-110/issue-10/features/hrsg-inspections.html>, retrieved on May 22, 2019, published Oct. 1, 2006, 8 pages.

testex-ndt.com [online], "HRSG Inspections," available on or before Mar. 18, 2016 via the Wayback Machine URL <https://web.archive.org/web/20160318001332/https://testex-ndt.com/services/hrsg-inspections/>, retrieved on May 22, 2019, retrieved from URL <https://testex-ndt.com/services/hrsg-inspections/>, 6 pages.

* cited by examiner

ULTRASONIC BASED INTERNAL INSPECTION OF TUBES

TECHNICAL FIELD

This disclosure relates to inspecting tubes such as finned tubes from inside of the tubes for detecting corrosion and scale buildup.

BACKGROUND

Fluids, for example, hydrocarbons or other fluids, are flowed through pipes. The flow and external conditions result in corrosion, scale buildup, and cracking of the interior and exterior of the pipes. Unchecked damage and buildup can result in pipe failure. Detecting corrosion and scale buildup in pipes can prevent the failure of pipes.

SUMMARY

This disclosure describes ultrasonic-based inspection of a pipe, for example, for detection of corrosion and scale buildup.

Implementations of the present disclosure include a sensor assembly communicatively coupled to a processing device. The sensor assembly is configured to be disposed within and move along a pipe configured to flow a fluid. The sensor assembly includes a tubular housing configured to be centrally retained within the pipe, the tubular housing including an outer diameter smaller than an internal diameter of the pipe. The sensor assembly also includes a plurality of ultrasonic elements coupled to and distributed evenly along an external surface of the tubular housing to define a gap between an outer surface of the ultrasonic elements and an internal surface of the pipe. The ultrasonic elements are configured to transmit ultrasonic signals and sense ultrasonic signals reflected from the internal surface of the pipe to sense corrosion and scale buildup information inside the pipe. The ultrasonic elements are configured to transmit the information to the processing device.

In some implementations, the sensor assembly further includes a first centering disc and a second centering disc. The first centering disc is coaxially coupled to a first end of the tubular housing. The first centering disc includes an outer diameter similar to the internal diameter of the pipe and defines an internal fluid channel configured to receive fluid from the pipe as the sensor assembly moves along the pipe and to direct the fluid to the gap between the ultrasonic elements and the internal surface of the pipe. The internal fluid channel forms a tubular fluid column of laminar flow that fluidically couples the ultrasonic elements with an internal surface of the pipe. The second centering disc is coaxially coupled to a second end of the tubular housing opposite the first end and has an outer diameter similar to the first centering disc. The second centering disc includes an internal fluid channel configured to receive, as the sensor assembly moves along the pipe, the fluid from the tubular fluid column and is configured to direct the fluid to an outlet of the second centering disc. In some implementations, the centering discs are detachable from the tubular housing. In some implementations, the tubular housing is attachable to centering discs of different sizes to fit within pipes of different internal diameters. In some implementations, each of the centering discs include a compliant outer surface conformable to surface variations of the internal surface of the pipe.

In some implementations, the sensor assembly is configured to sense corrosion and scale buildup information of at least one of the internal surface of the pipe, an external surface of the pipe, and external fins of the pipe. In some implementations, the ultrasonic elements are configured to sense corrosion and scale buildup information of the external surface of the pipe and to sense damage information of the external fins of the pipe by sensing ultrasonic signals reflected back from an interface between two dissimilar materials.

In some implementations, the sensor assembly is configured to sense thermal fatigue cracking at an external surface of the pipe by steering a direction of the ultrasonic signals transmitted by the ultrasonic elements to travel in a non-orthogonal direction with respect to an external surface of the ultrasonic elements.

In some implementations, the processing device is configured to generate, based on the information, a time of flight curve representing a presence or absence of corrosion and scale buildup along the pipe. In some implementations, the processing device has a display device configured to display a user interface. The processing device is configured to perform ultrasonic data acquisition associated with pipes. The display device is configured to display, in the user interface, the time of flight curve generated by the processing device.

In some implementations, the sensor assembly is electrically coupled to a rotating cleaning brush configured to clean an interior diameter of the pipe to prepare the pipe to be inspected by the sensor assembly.

Implementations of the present disclosure also include a system that includes a processing device and a sensor assembly communicatively coupled to a processing device. The sensor assembly is configured to be disposed within and move along a pipe configured to flow a fluid. The sensor assembly includes a tubular housing configured to be centrally retained within the pipe, the tubular housing including an outer diameter smaller than an internal diameter of the pipe. The sensor assembly also includes a plurality of ultrasonic elements coupled to and distributed evenly along an external surface of the tubular housing to define a gap between an outer surface of the ultrasonic elements and an internal surface of the pipe. The ultrasonic elements are configured to transmit ultrasonic signals and sense ultrasonic signals reflected from the internal surface of the pipe to sense corrosion and scale buildup information inside the pipe. The ultrasonic elements are configured to transmit the information to the processing device.

In some implementations, the sensor assembly further includes a first centering disc and a second centering disc. The first centering disc is coaxially coupled to a first end of the tubular housing. The first centering disc includes an outer diameter similar to the internal diameter of the pipe and defines an internal fluid channel configured to receive fluid from the pipe as the sensor assembly moves along the pipe and to direct the fluid to the gap between the ultrasonic elements and the internal surface of the pipe. The internal fluid channel forms a tubular fluid column of laminar flow that fluidically couples the ultrasonic elements with an internal surface of the pipe. The second centering disc is coaxially coupled to a second end of the tubular housing opposite the first end and has an outer diameter similar to the first centering disc. The second centering disc includes an internal fluid channel configured to receive, as the sensor assembly moves along the pipe, the fluid from the tubular fluid column and is configured to direct the fluid to an outlet of the second centering disc. In some implementations, the centering discs are detachable from the tubular housing. In some implementations, the tubular housing is attachable to centering discs of different sizes to fit within pipes of different internal diameters. In some implementations, each of the centering discs include a compliant outer surface conformable to surface variations of the internal surface of the pipe.

In some implementations, the sensor assembly is configured to sense corrosion and scale buildup information of at least one of the internal surface of the pipe, an external surface of the pipe, and external fins of the pipe.

In some implementations, the processing device is communicatively coupled to a memory storying instructions that can be executed by the processing device to generate, based on the received information from the sensor assembly, a time of flight curve representing a presence or absence of corrosion and scale buildup along the pipe. In some implementations, the processing device includes a display device configured to display a user interface, the processing device configured to perform ultrasonic data acquisition associated with pipes, and the display device configured to display, in the user interface, the time of flight curve generated by the processing device.

Implementations of the present disclosure include a method that includes receiving, by a processing device and from a sensor assembly communicatively coupled to the processing device, corrosion and scale buildup information about an internal surface of a pipe. The sensor assembly is disposable within and movable along the pipe configured to flow a fluid. The sensor assembly includes a tubular housing configured to be centrally retained within the pipe, the tubular housing including an outer diameter smaller than an internal diameter of the pipe. The sensor assembly also includes a plurality of ultrasonic elements coupled to and distributed evenly along an external surface of the tubular housing to define a gap between an outer surface of the ultrasonic elements and an internal surface of the pipe. The ultrasonic elements are configured to transmit ultrasonic signals and sense ultrasonic signals reflected from the internal surface of the pipe to sense corrosion and scale buildup information inside the pipe. The ultrasonic elements are configured to transmit the information to the processing device. The method further includes determining, based on the received information, a location of scale formation or corrosion in the pipe.

In some implementations, determining the location of scale formation or corrosion in the pipe includes determining a value representative of an amount of corrosion or scale buildup in the pipe.

In some implementations, the method further including generating, by the processing device and based on the received information from the sensor assembly, a time of flight curve representing a presence or absence of corrosion and scale buildup along the pipe. In some implementations, the processing device includes a display device configured to display a user interface, where the method further includes performing, by the processing device, ultrasonic data acquisition associated with pipes, and displaying, by the processing device on the display device, the time of flight curve generated by the processing device.

In some implementations the sensor assembly is configured to sense corrosion and scale buildup information of at least one of the internal surface of the pipe, an external surface of the pipe, and external fins of the pipe. In some implementations, receiving the information includes receiving corrosion and scale buildup information of at least one of the internal surface of the pipe, the external surface of the pipe, and the external fins of the pipe.

DETAILED DESCRIPTION OF THE DISCLOSURE

The present disclosure relates to using a sensor assembly with ultrasonic elements (for example, ultrasonic sensors) to detect corrosion and erosion of tubes. The ultrasonic elements are attached to a tubular housing configured to be disposed inside a tube. The ultrasonic elements send signals in a radial direction that reflect from walls of the pipe back to the ultrasonic elements. A time of flight of the signals is used to determine the presence or absence of corrosion or scale buildup. The tubular housing is centered by centering rings that can direct fluid from the pipe to a gap between the ultrasonic elements and an interior surface of the pipe to form a fluid coupling that improves the readings of the ultrasonic elements.

Implementations of the present disclosure may provide one or more of the following advantages. Corrosion and other defects inside and outside a pipe can be detected by using ultrasonic signals. As opposed to tools that rely on electromagnetic waves, the presence of ferromagnetic fins does not affect the readings of the sensor assembly because, for example, ultrasonic waves do not reflect back from an interface between the fins and the external surface of the pipe, if the interface match is perfect or of similar material. For fins made of a dissimilar material than the pipe, the waves will reflect back showing as the external surface on the screen. Thus, the detection of corrosion, erosion, and scale build up is not affected by the presence of ferromagnetic fins on the outer surface of the tube. Some systems for detection of corrosion and scale buildup use electromagnetic sensors and instruments that detect corrosion from outside the pipes. Some systems can only detect corrosion in the interior surface of a pipe. The present disclosure describes a system that allows corrosion and scale buildup to be reliably detected from inside the pipe. Additionally, the ultrasonic elements can detect mechanically damaged fins (for example, broken or bent fins) from the interior of the pipe.

Figure 1:
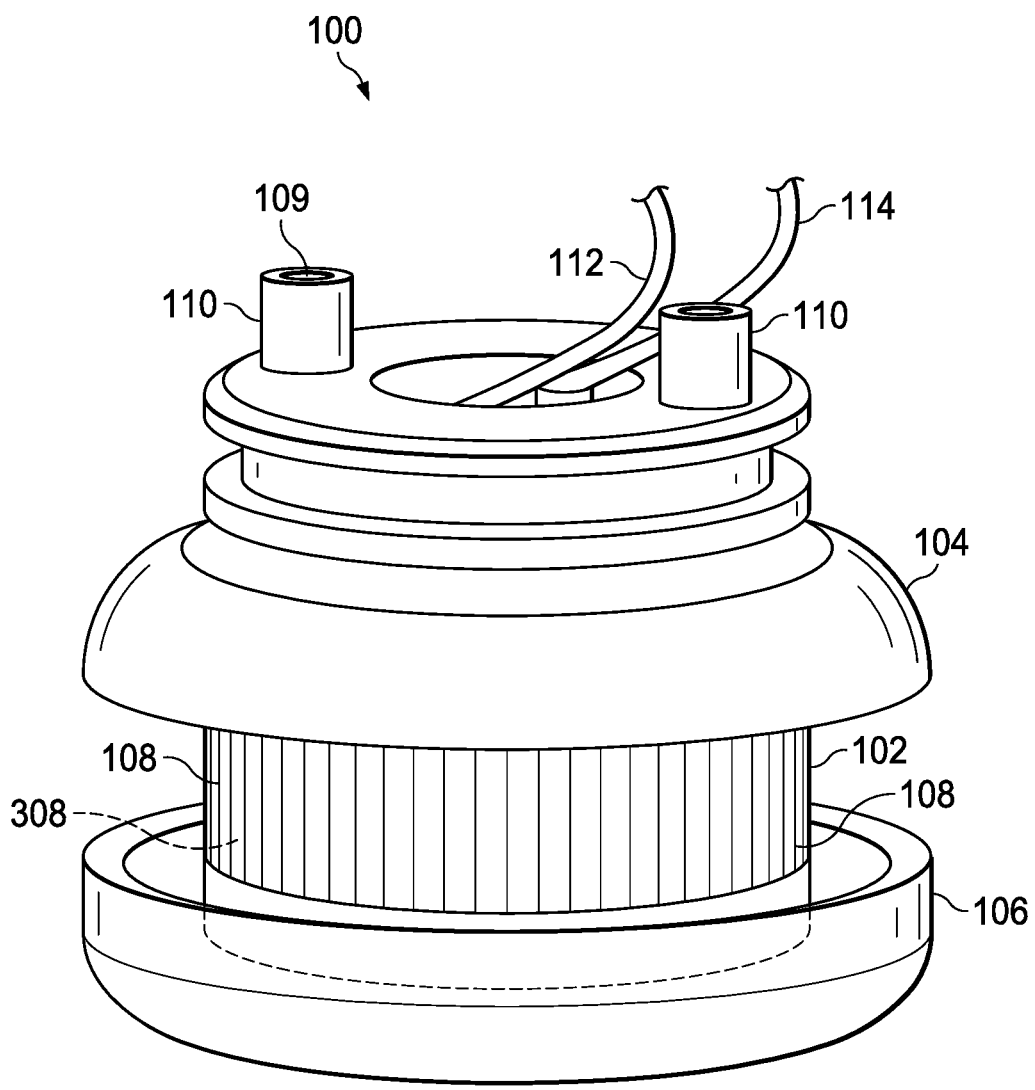
FIG. 1 is a perspective view of a sensor assembly according to implementations of the present disclosure.

FIG. 1 shows a sensor assembly 100 according to implementations of the present disclosure. Sensor assembly 100 includes an array 102 of ultrasonic elements 108 (for example, ultrasonic transmitters and ultrasonic receivers) coupled to and distributed (for example, evenly or irregularly distributed) along an external surface such as an entire circumference of a tubular housing 308 (see FIGS. 2A and 3). The number of ultrasonic elements 108 depend on the diameter of tubular housing 308. For example, sensor assembly 100 can have 16, 32, 64, 128, 256, or more elements attached to tubular housing 308. As further described in detail later with respect to FIGS. 2A and 3, sensor assembly 100 is configured to be disposed within a pipe to detect corrosion, erosion, scale buildup (for example, sulfide scale buildup), and thermal fatigue cracking in the pipe. Sensor assembly 100 can also detect fin defects of the pipe (for example, broken fins), and other information that can compromise the integrity of the pipe.

Sensor assembly 100 inspects a pipe by moving along a longitudinal axis of the pipe to sense corrosion and scale buildup in the internal surface of the pipe. Ultrasonic elements 108 transmit ultrasonic signals that propagate toward an internal wall of the pipe and sense ultrasonic signals reflected from the internal wall of the pipe to sense corrosion and scale buildup information inside and outside the pipe. To sense the corrosion and scale buildup information, tubular housing 308 (and by extension the ultrasonic elements 108) of sensor assembly 100 is centrally retained within the pipe to prevent tubular housing 308 from moving radially about the pipe. For example, sensor assembly 100 has a first centering disc 104 and a second centering disc 106 that constrain tubular housing 308 to movement along a central axis of the pipe. First centering disc 104 is coaxially coupled to a first end of tubular housing 308 and second centering disc 106 is coaxially coupled to a second end of tubular housing 308, opposite the first end. As further described later with respect to FIGS. 2A and 3, sensor assembly 100 includes cables 112 and 114 that extend from sensor assembly 100 to a processing device and a power source. Sensor assembly 100 also has internal channels 110 with inlets 109 to receive fluid from the pipe and form a fluid ring around ultrasonic elements 108 to improve ultrasonic coupling of elements 108 with the wall of the pipe.

Figure 2A:
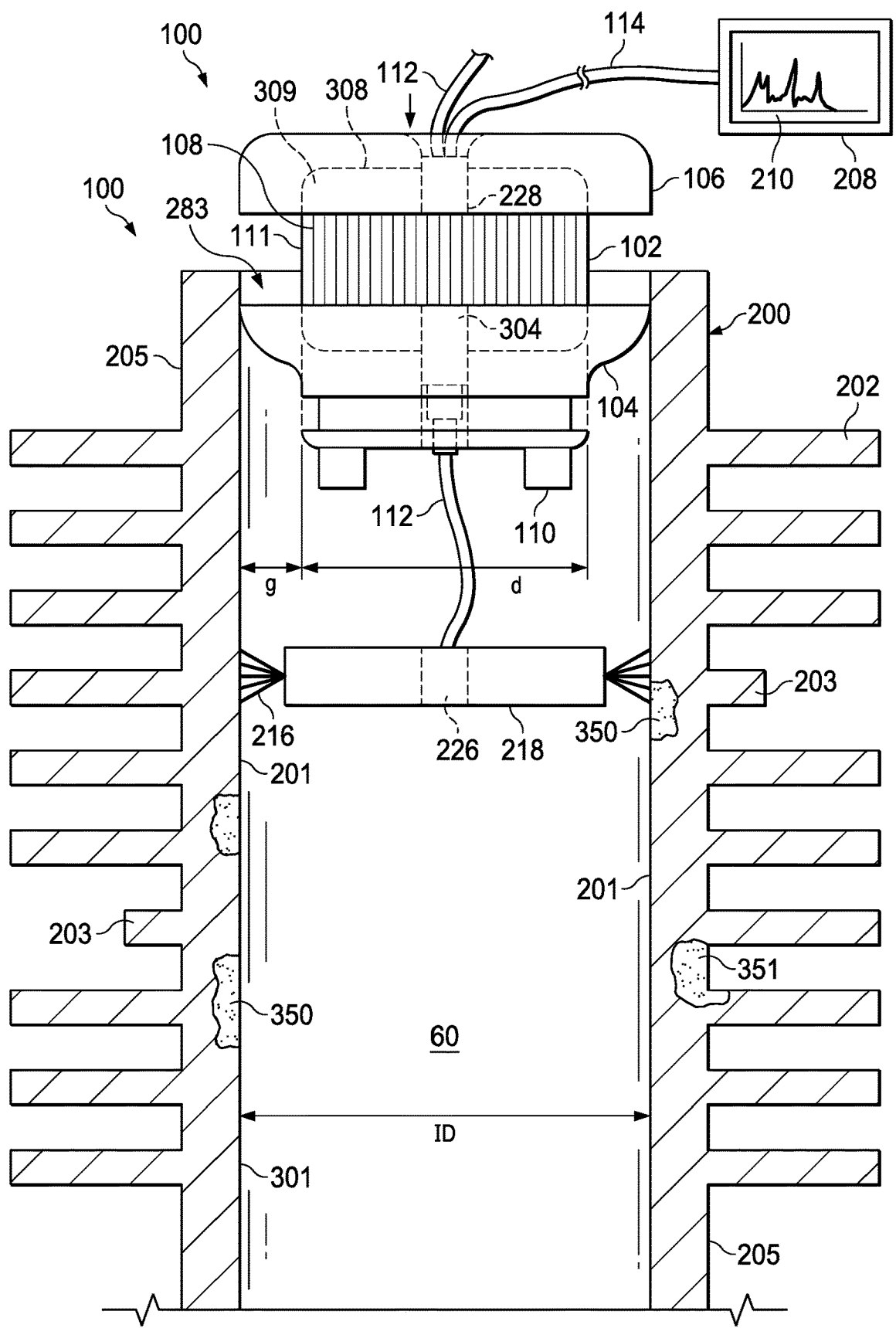
FIG. 2A is a side, partial cross-sectional view of the sensor assembly of FIG. 1, the sensor assembly being disposed within a pipe.

Referring to FIG. 2A, sensor assembly 100 can be disposed within a pipe 200 to detect internal corrosion 350, external corrosion 351, and other pipe defects. For example, pipe 200 can be a finned pipe, and sensor assembly 100 can detect broken and bent fins 203. Sensor assembly 100 can inspect a finned pipe of a heat recovery steam generation (HRSG) system or a similar finned pipe such as a boiler tube. Pipe 200 has an internal surface 201 and an external surface 205. Pipe 200 can have external fins 202 that extend from external surface 205. As further described in detail later, sensor assembly 100 can detect internal corrosion 350 (or other indications or formations) in the internal surface 201 of pipe 200. Sensor assembly 100 can also detect external corrosion 351 (or thermal cracking and scale buildup) and damaged fins 203 or bent fins.

Pipe 200 flows a fluid 60 such as water, cooling fluid, or gas. To inspect pipe 200, sensor assembly 100 is disposed within pipe 200 from an inlet 283 of pipe 200 and moved along pipe 200 while pipe 200 flows fluid 60. Sensor assembly 100 can move along tubes by gravity, by fluid flow, or by an active source such as a motor (not shown). For example, sensor assembly 100 can move along a vertical or inclined pipe from the inlet 283 of the pipe 200 to an outlet of pipe 200, in which the inlet of pipe 200 is at a higher elevation than the outlet of pipe 200. In another example, a fluid at a first pressure can be flowing at one end of sensor assembly 100 such that the fluid in pipe 200 on the other end of sensor assembly 100 is at a second pressure lower than the first pressure, such that the pressure differential moves sensor assembly 100 along pipe 200. Additionally, a motor with a propeller (not shown) can be attached to sensor assembly 100 to move sensor assembly 100 along pipe 200. Centering discs 104 and 106 help ensure that sensor array 102 travels along the center of pipe 200 as sensor assembly 100 moves along pipe 200. Ultrasonic elements 108 are communicatively connected, through a cable 114, to a processing device 208 such as a phased array instrument. For example, ultrasonic elements 108 can be electrically coupled to circuitry 304 that is electrically coupled, through cable 114 or wirelessly or both, to processing device 208. Ultrasonic elements 108 can be powered by a power cable 122 connected to circuitry 304.

Figure 2B:
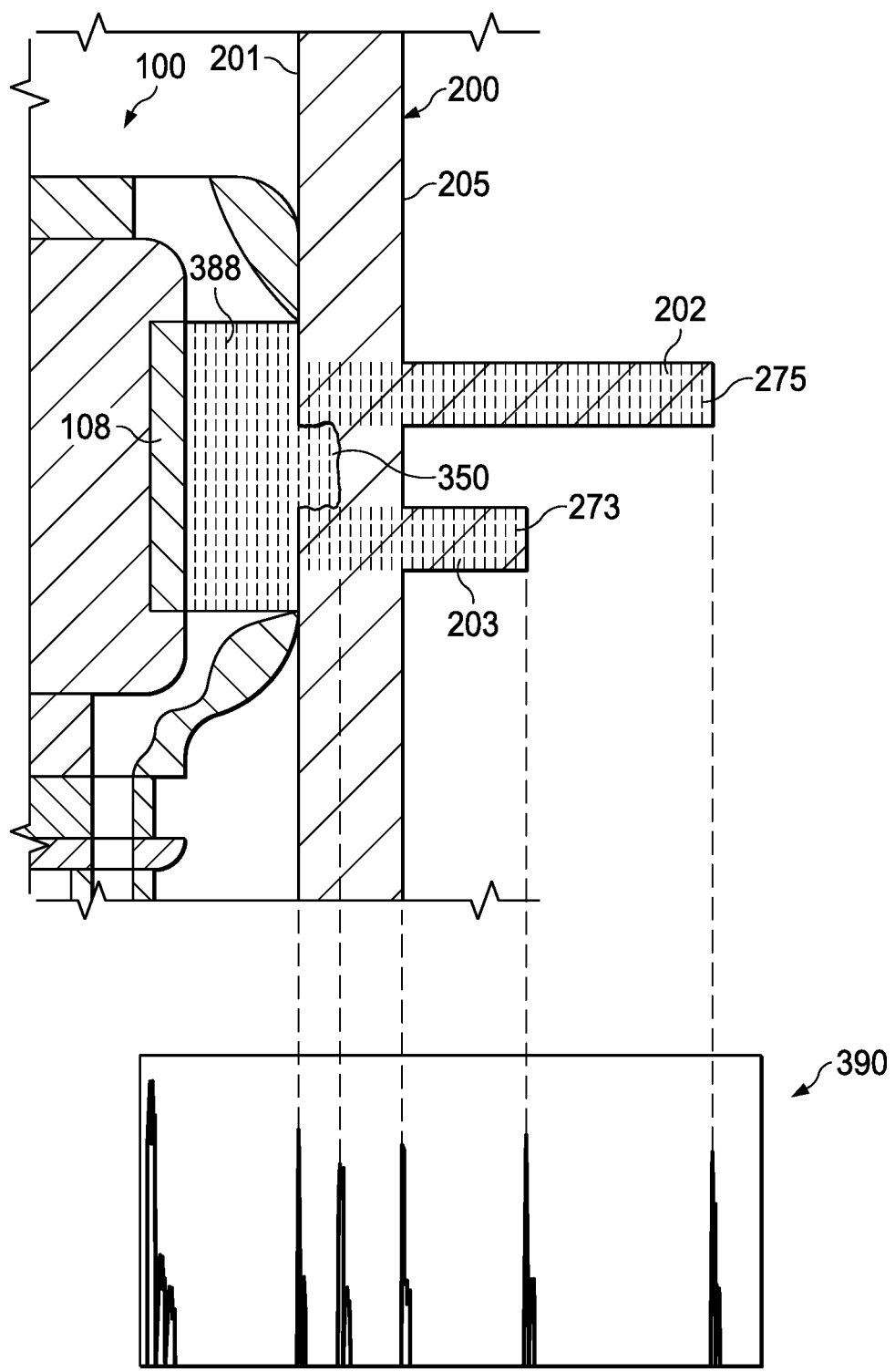
FIG. 2B is a schematic diagram of a curve representing the interaction of ultrasonic waves with different pipe surfaces.

Processing device 208 has a display device 210 configured to display a user interface with readings of the sensor assembly 100. Processing device 208 can be configured to perform ultrasonic data acquisition specific for pipes and finned pipes. For example, referring also to FIG. 2B, the ultrasonic elements 108 can sense reflected signals (for example, mechanical waves) that produce readings of a finned pipe that can be sent to processing device 208 for analysis. Upon receiving the readings, processing device 208 can generate a curve 390 or graph representing the ultrasonic interaction of the signals with the walls of pipe 200. Ultrasound may travel as mechanical waves 388. Mechanical waves 388 may be planar in nature, and can travel in a medium such as fluid (for example, liquid) and solid surfaces such as across the walls and fins 202 of pipe 200. At any interface (for example, at the boundary between two dissimilar materials) an interacted wave portion reflects back to ultrasonic elements 108. When ultrasonic elements 108 sense the reflected waves, such information is sent to processing device 208 to display the information on display device 210 represented as peaks in the graph 390. More specifically, a portion of the waves 388 will reflect back from internal wall 201, a portion of waves 388 will reflect back from a corroded surface 350 of internal wall 201, another portion of waves 388 will reflect back from the external surface 205 of pipe 200, another portion of waves 388 will reflect back from an edge 273 of a broken fin 203, and a last portion of waves 388 will reflect back from an edge 275 of an 'intact' fin 202. In the case of bent fins (not shown), the waves 388 will not reflect back from the edge of the fin. Each reflected wave reaches ultrasonic elements 108 at a different time, represented in the graph 390 as spaces between the peaks. Thus, a time of flight of the planar waves 388 provide the information for the location of damages in the radial direction of pipe 200. As such, when there is no problem or damage in pipe 200 (for example, there is no corrosion and no damaged fins) electronic display 210 only displays the indications or peaks from waves reflected from internal surface 201, external surface 205, and from the edges 275 of intact fins 202. To detect a location of the damage along an axial direction of pipe 200, sensor assembly 100 can be equipped with one or more micro encoders that can mark a precise location of flaws in the axial direction. As further discussed in detail later with respect to FIGS. 4A-4D, display device 210 can display a time of flight curve representing a presence and location of corrosion and scale buildup along pipe 200.

Ultrasonic elements 108 include ultrasonic transmitters and ultrasonic receivers that form an ultrasonic phased array 102 to sense corrosion and scale buildup information inside pipe 200. Ultrasonic elements transmit the corrosion and scale buildup information to computing device 208 to process the information. Ultrasonic elements 108 are coupled to and distributed evenly along an external surface 309 of tubular housing 308 to define a gap 'g' between an outer surface 111 of the ultrasonic elements 108 and internal surface 201 of pipe 200. As described earlier, ultrasonic elements 108 can transmit ultrasonic signals in a radial direction of the pipe 200 and sense ultrasonic signals reflected from internal surface 201 of pipe 200 to sense corrosion and scale buildup information inside pipe 200.

For example, the ultrasonic transmitters of the ultrasonic elements 108 send ultrasonic signals (for example, mechanical waves such as pressure waves) continuously toward internal surface 201 as sensor assembly 100 moves along pipe 200. The ultrasonic signals travel from the transmitter to internal surface 201 of pipe 200 through fluid. The ultrasonic signals reflect back from internal surface 201 to the ultrasonic receivers. A time of flight of the signals can be used to determine if there is corrosion in internal surface 201. In this disclosure, time of flight is the time it takes a signal to travel from a transmitter, to a surface of the pipe, and back to a receiver. The distance from ultrasonic elements 108 to a surface of pipe 200 can vary if there is corrosion in pipe 200. For example, a signal may travel a longer distance when reflected back from a corroded surface than from a surface without corrosion. Similarly, a signal may travel a shorter distance when reflected back from a scale formation than from a surface without scale formation. If the ultrasonic signal reflects from a portion of internal surface 201 that does not have corrosion, the time of flight of the signal indicates that there is no corrosion. If the ultrasonic signal reflects from a portion of internal surface 201 that has corrosion, the time of flight of the ultrasonic signal can be longer than if there is no corrosion, indicating that there is or there could be corrosion in pipe 200. The time of flight of the ultrasonic signals can be used by processing device 208 to determine the presence of corrosion inside and outside pipe 200.

As opposed to tools that rely on electromagnetic waves, the presence of ferromagnetic fins 202 does not affect the readings of sensor assembly 100 because the nature of the ultrasonic wave is not affected by fins 202. For example, because ultrasonic waves are mechanical in nature, the ultrasonic waves can travel through the interface between the fins and the outer surface of the pipe without reflecting back to the ultrasonic elements 108.

Figure 2C:
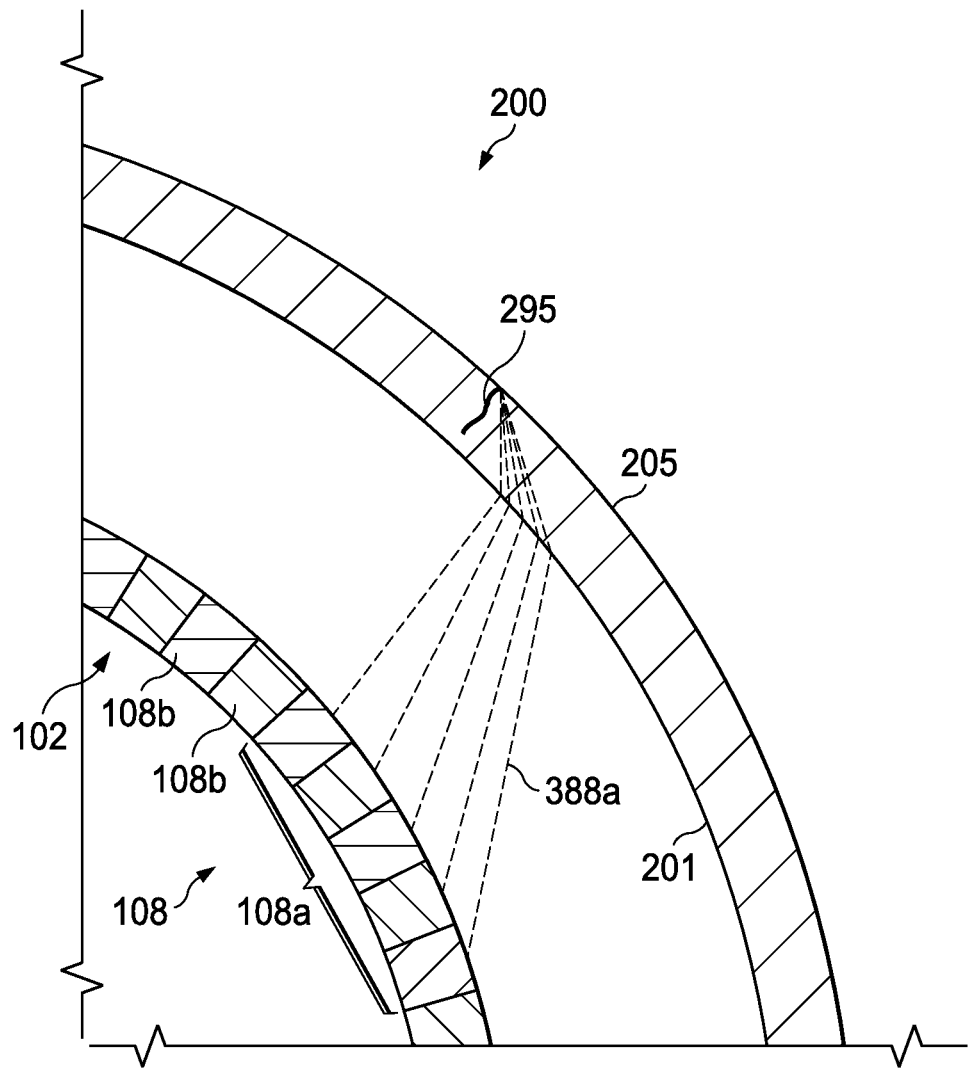
FIG. 2C is a bottom cross-sectional, schematic view of a portion of a sensor assembly showing beam steering capabilities.

As shown in FIG. 2C, ultrasonic elements 108 can also sense thermal fatigue cracking 295 (for example, cracking in the axial direction) at external surface 205 of pipe 200 by using beam steering capabilities of ultrasonic element array 102. For example, a group of ultrasonic elements 108a can be 'steered' to generate ultrasonic waves 388a in a particular direction (for example, in a non-orthogonal direction with respect to the external surface of the elements), which can depend on the diameter of the sensor array 102 and the pipe 200, and on the space between ultrasonic elements 108 and internal surface 201 of pipe 200. The group of ultrasonic elements 108a can fire sequentially, all across the ultrasonic elements to provide full coverage for detecting cracks in the external surface 205. The rest of ultrasonic sensors 108b can send signals in an orthogonal direction when the group of ultrasonic sensors 108a are not sending signals. Additionally, for beam steering, the set of ultrasonic elements 108a can circle around the full sensor assembly in 360 degrees to provide a full coverage on the external surface of the pipe 200, and for higher sensitivity, the same can be accomplished in clockwise direction.

Centering discs 104 and 106 are coaxially coupled to tubular housing 308 to ensure that sensor array 102 is centrally retained within pipe 200 as sensor assembly 100 moves through pipe 200. By remaining generally centered along pipe 200, ultrasonic elements 108 can accurately sense corrosion and scale buildup information in pipe 200. Ultrasonic elements 108 are attached to tubular housing 308 that has an outer diameter smaller than an internal diameter of pipe 200. For example, ultrasonic elements 108 around tubular housing 308 form an outer diameter 'd' that is smaller than internal diameter 'ID' of pipe 200 to define the gap 'g' between the sensors 108 and internal surface 201 of pipe 200. The internal diameter 'ID' of pipe 200 can be, for example, 1.5, 2, or 2.25 inches. First centering disc 104 and second centering disc 106 have respective outer diameters that are similar to internal diameter 'ID' of pipe 200 to snuggly fit within pipe 200. Centering discs 104 and 106 can retain tubular housing 308 centrally within pipe 200 such that a longitudinal axis of tubular housing 308 remains generally aligned with a central axis of pipe 200 as sensor assembly 100 moves along pipe 200. Centering discs 104 and 106 can have a compliant outer surface that is conformable to surface variations of internal surface 201 of pipe 200. The compliant surface of centering discs 104 and 106 can help retain tubular housing 308 within the center of pipe 200 when passed through surface variations (for example, variations that extend inwardly 2 mm from the internal surface 201), increasing a reliability and accuracy of the readings.

Sensor assembly 100 can be electrically connected, through cable 112, to a rotating cleaning brush 218. Rotating brush 218 has bristles 216 extending from a periphery of brush 218 configured to clean interior surface 201 of pipe 200. Interior surface 201 of pipe 200 can be cleaned by rotating brush 218 to prepare pipe 200 to be inspected by sensor assembly 100. For example, rotating brush 218 can travel in front of sensor assembly 100 to remove crud and corrosion products inside pipe 200 to allow sensor assembly 100 to detect defects of pipe 200. Rotating brush 218 can be powered by power cable 112 connected to a power source (not shown). Power cable 112 is electrically connected to an adjustable speed electric motor 226 of brush 218. Cable 112 passes through a center hole 228 of tubular housing 308 that extends from first centering disc 104 to second centering disc 106. For example, cable 112 can be connected to circuitry 304 at one end of sensor assembly 100, and extend from circuitry 304 at an opposite end of sensor assembly 100 to connect to brush 218. Circuitry 304 can be housed within hole 228 inside a sealed case that protects the circuitry from fluid 60 inside pipe 200. A width of brush 218 and of the sensor assembly 100, and a distance between brush 218 and sensor assembly 100 can be kept to a minimum to allow brush 218 and sensor assembly 100 to be maneuvered across bends in pipe 200.

Figure 3:
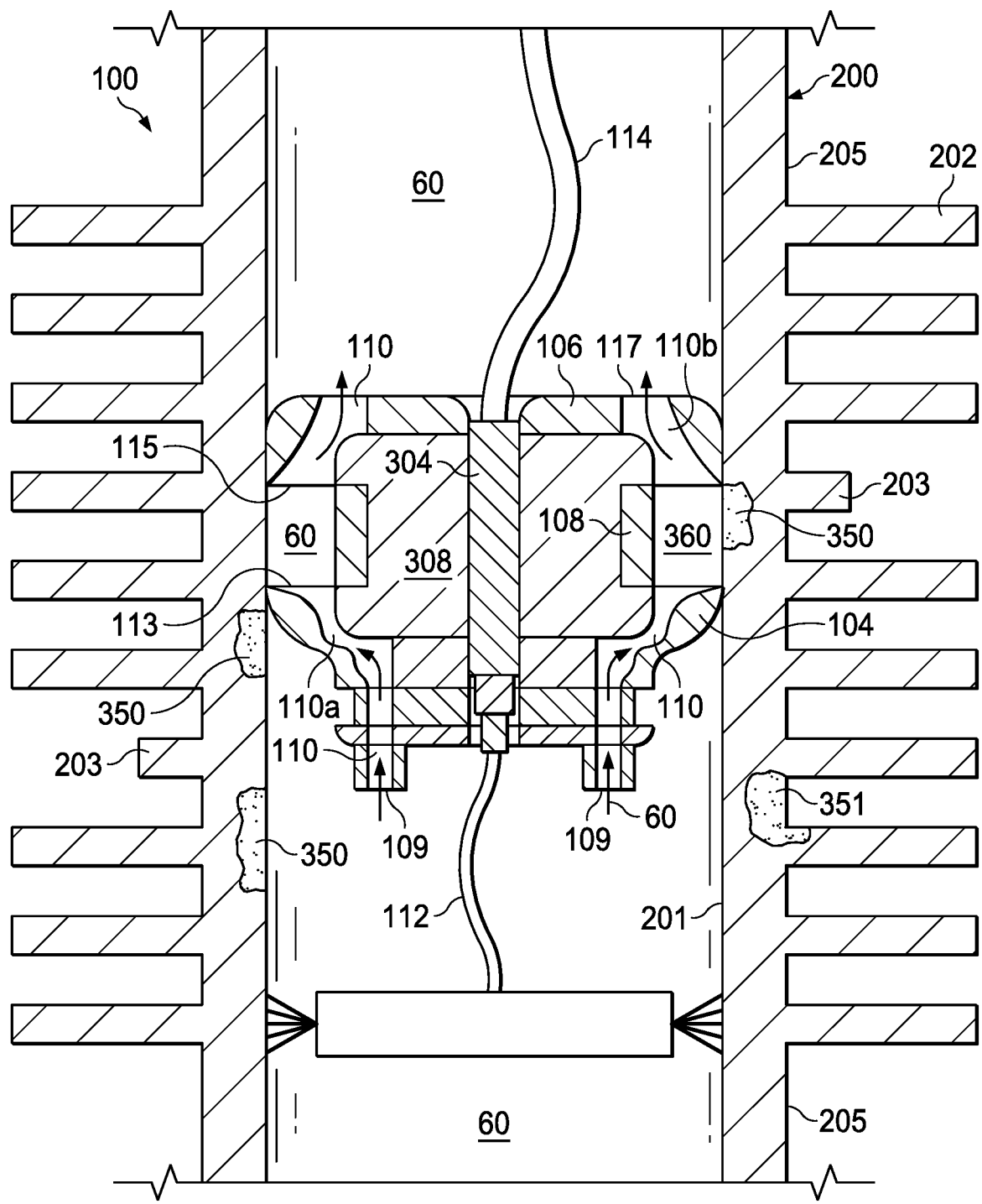
FIG. 3 is a side, cross sectional view of the sensor assembly of FIG. 1, the sensor assembly disposed within the pipe.

FIG. 3 shows a cross-section of sensor assembly 100 to illustrate an example implementation of centering discs 104 and 106 with internal fluid channels 110. Fluid channels 110 receive fluid 60 from pipe 200 as sensor assembly 100 is moved along pipe 200. Fluid channels 110 direct fluid 60 from outside sensor assembly 100 to the gap 'g' (see FIG. 2A) between ultrasonic elements 108 and internal wall 201 to form a fluid coupling between the two. For example, fluid channels 110 are shaped to form, as sensor assembly 100 moves along pipe 200, a tubular fluid column 360 or fluid ring of laminar flow that couples (for example, fluidically couples) ultrasonic elements 108 with internal surface 201 of pipe 200. The fluid coupling allows the ultrasonic signals a traveling medium and thus improve the readings of sensor assembly 100. Fluid channels 110 are radial channels, extending radially inside centering discs 104 and 106. For example, a fluid channel 110*a* of first centering disc 104 extends from one or more inlets 109 facing fluid 60 to a common outlet 113 of annular shape. As fluid 60 flows out of channel 110*a* through outlet 113, fluid 60 forms fluid column 360 that contacts ultrasonic elements 108 and internal surface 201 of pipe 200. Fluid column 360 is received by inlet 115 of fluid channel 110*b* of second centering disc 106. Fluid channel 110*b* directs fluid 60 of the fluid column 360 to an outlet 117 of fluid channel 110*b* to mix with fluid 60 flowing in pipe 200.

Figure 4A:
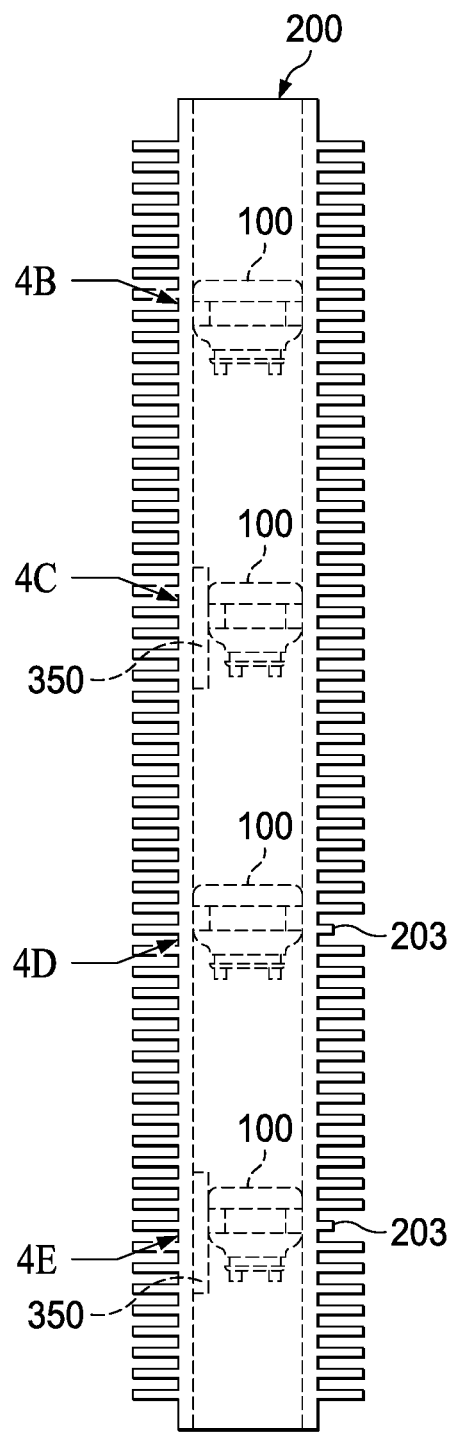
FIG. 4A shows a schematic view of a sensor assembly at different locations of a finned pipe.
Figure 4B:
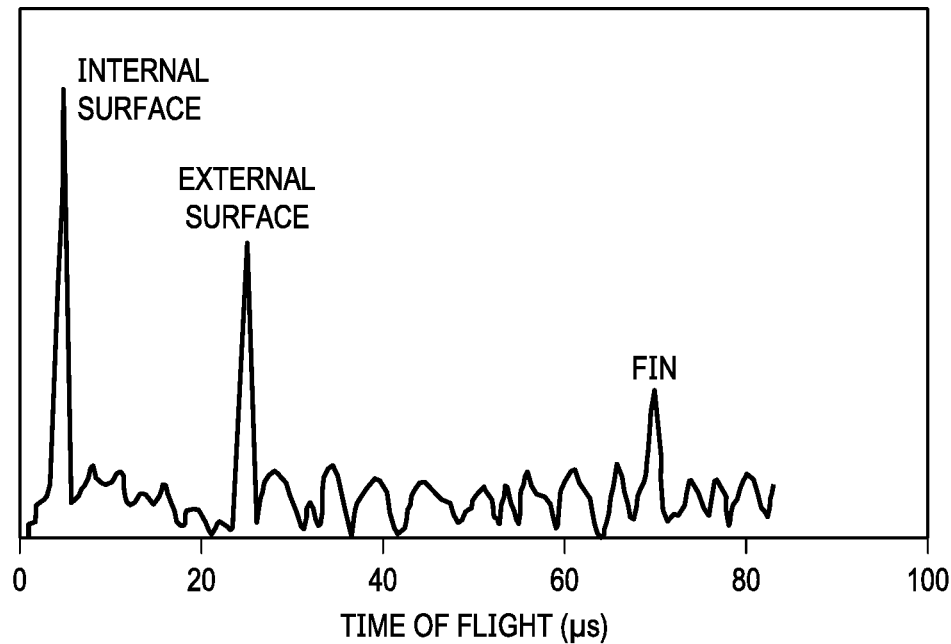
FIGS. 4B-4E illustrate time of flight curves of ultrasonic signals at the respective locations of FIG. 4A.
Figure 4C:
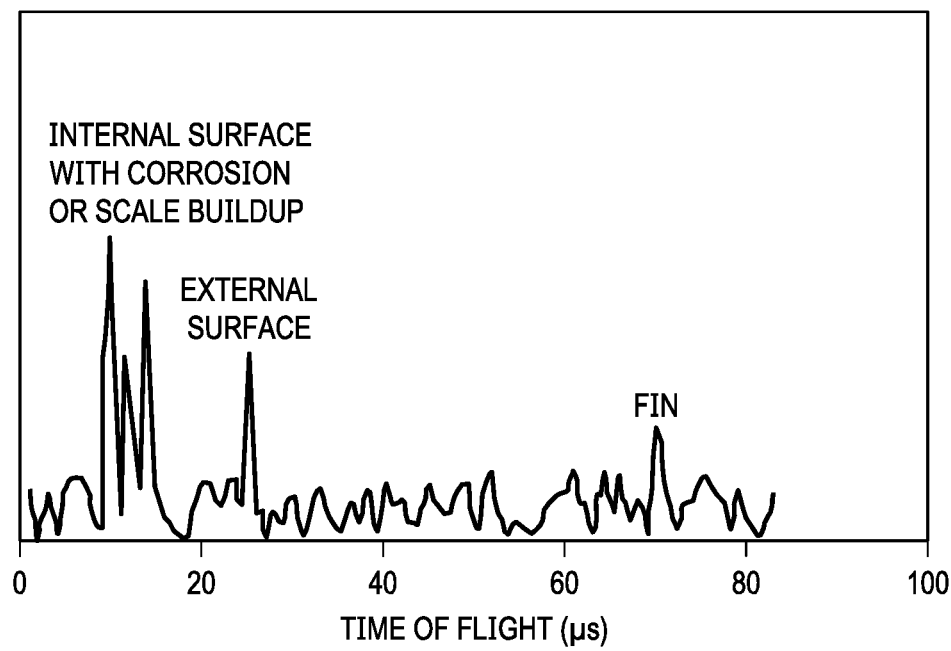
Figure 4D:
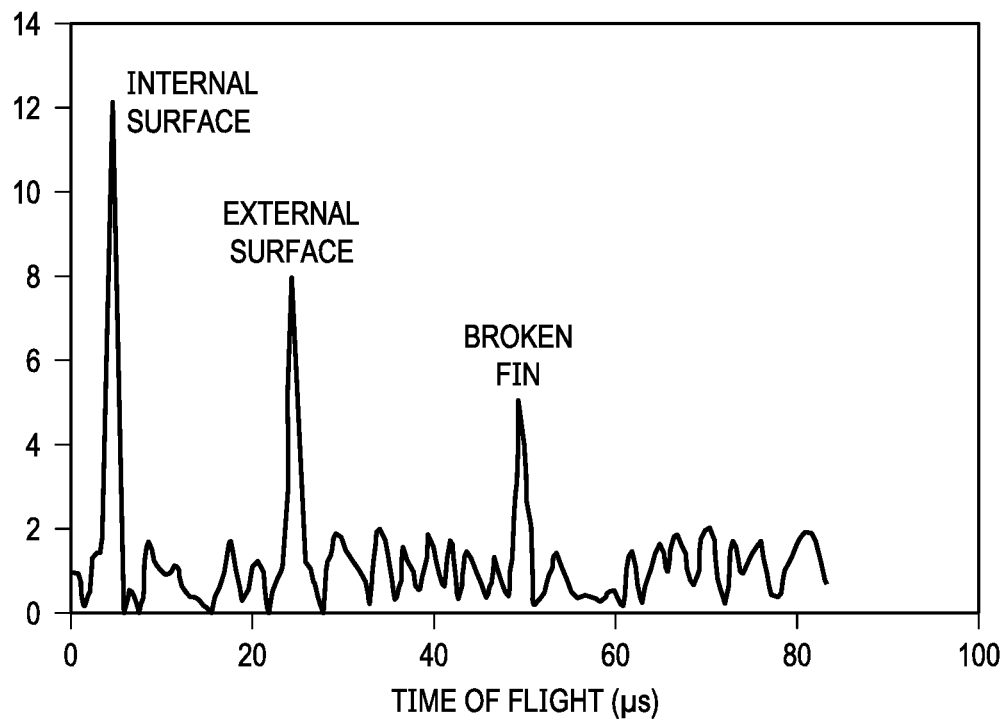
Figure 4E:
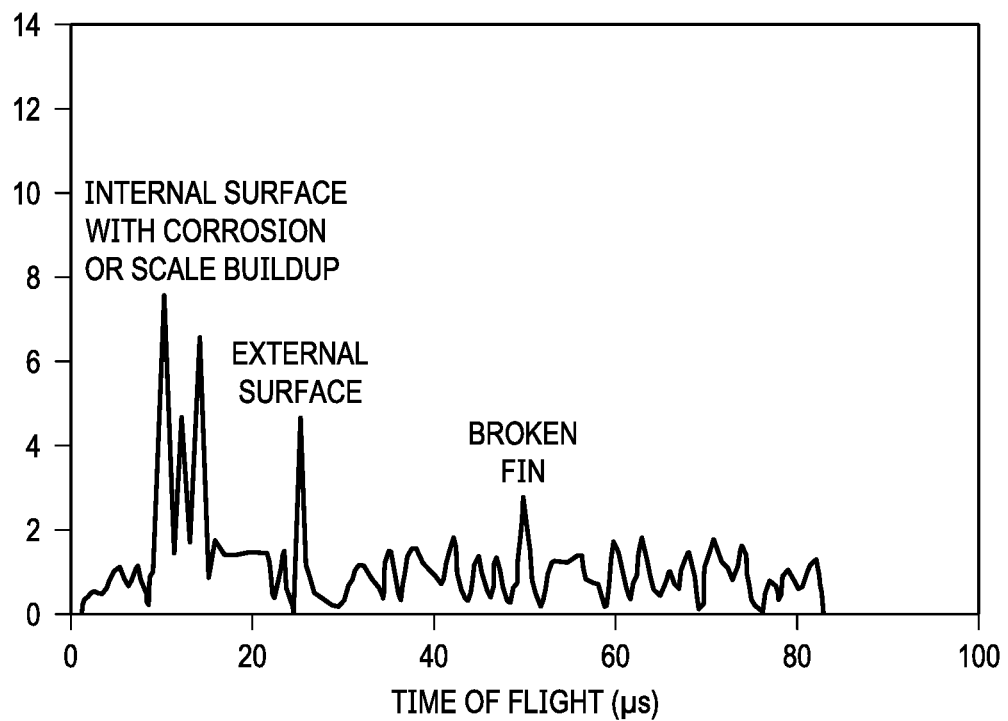

FIG. 4A shows sensor assembly 100 at different locations of a pipe 200. FIGS. 4B-4E, illustrate time of flight curves (for example, time of flight vs time curves) generated by processing device 208 (see FIG. 2A). As shown in FIG. 4A, the time of flight curves are generated base on information received from sensor assembly 100 as sensor assembly 100 moves along pipe 200. The time of flight curves represent the presence or absence of corrosion and scale buildup along pipe 200 at different locations of pipe 200. For example, as shown in FIG. 4A, sensor assembly 100 moves along pipe 200 and senses information about pipe 200 at locations 4B, 4C, 4D, and 4E. FIG. 4B illustrates a time of flight curve generated based on information sensed at location 4B, FIG. 4C illustrates a time of flight curve generated based on information sensed at location 4C, FIG. 4D illustrates a time of flight curve generated based on information sensed at location 4D, and FIG. 4E illustrates a time of flight curve generated based on information sensed at location 4E.

Referring to FIGS. 4A and 4B, sensor assembly 100 is positioned at a 'good location' 4B of pipe 200. Pipe 200 does not have corrosion or broken fins at location 4B. Thus, FIG. 4B illustrates a curve for which the signals reflected from the internal surface, the external surface, and the fins have a normal time of flight. Referring to FIGS. 4A and 4C, sensor assembly 100 is positioned at a 'bad location' 4C of pipe 200. Pipe 200 has internal corrosion 350 or scale buildup at location 4C. Thus, FIG. 4C illustrates a curve for which the signals reflected from the external surface and the fins have a normal time of flight, and for which the signals reflected from the internal surface indicates that there is corrosion in pipe 200. Referring to FIGS. 4A and 4D, sensor assembly 100 is positioned at a 'bad location' 4D of pipe 200. Pipe 200 has a broken fin 203 at location 4D. Thus, FIG. 4D illustrates a curve for which the signals reflected from the internal surface and the external surface have a normal time of flight, and for which the signals reflected from broken fin 203 indicate that there is a broken fin in pipe 200. Referring to FIGS. 4A and 4E, sensor assembly 100 is positioned at a 'bad location' 4E of pipe 200. Pipe 200 has internal corrosion or scale buildup and a broken fin at location 4E. Thus, FIG. 4E illustrates a curve for which the signals reflected from the external surface has a normal time of flight, and for which the signals reflected from the internal surface and from broken fin 203 indicates that there is corrosion or scale buildup and a broken fin.

Figure 5:
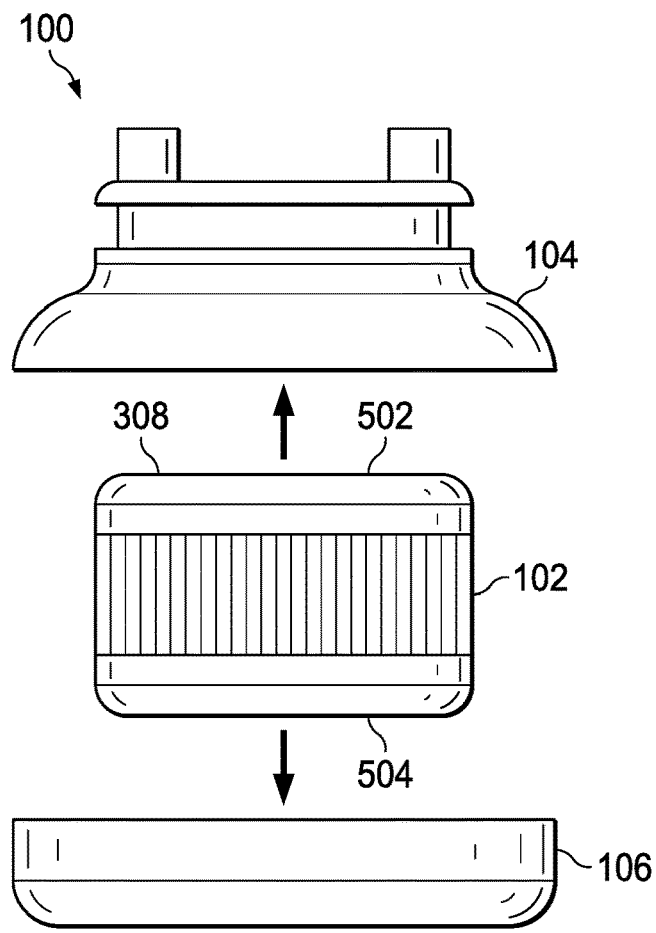
FIG. 5 is an exploded view of the sensor assembly.

Referring to FIG. 5, centering discs 104 and 106 can be detachable centering discs. Centering discs 104 and 106 detach from respective ends 502 and 504 of tubular housing 308 to allow tubular housing 308 to be attached to centering discs of different sizes to fit within pipes of different internal diameters.

Figure 6:
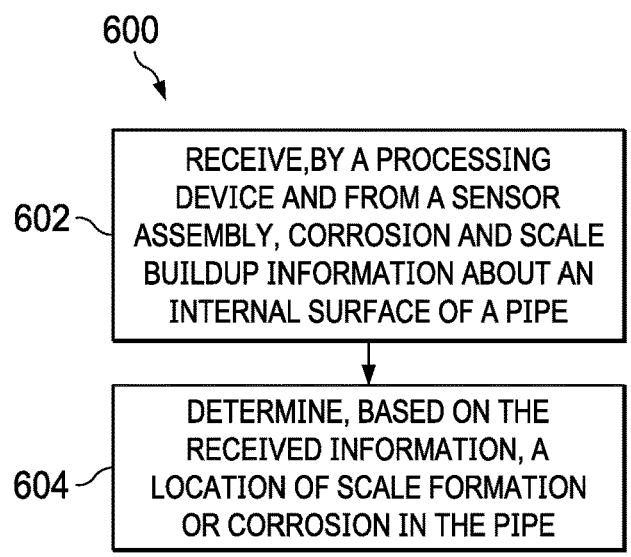
FIG. 6 is a flowchart of a method of locating scale formation and corrosion in a pipe.

FIG. 6 shows a flowchart of an example method 600 of detecting corrosion in a pipe. The method includes receiving, by a processing device and from a sensor assembly communicatively coupled to the processing device, corrosion and scale buildup information about an internal surface of a pipe (602). The sensor assembly is disposable within and movable along the pipe configured to flow a fluid. The method also includes determining, based on the received information, a location of scale formation or corrosion in the pipe (604).

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, or to about another particular value or a combination of them. When such a range is expressed, it is to be understood that another implementation is from the one particular value or to the other particular value, along with all combinations within said range or a combination of them.

Throughout this application, where patents or publications are referenced, the disclosures of these references in their entireties are intended to be incorporated by reference into this application, in order to more fully describe the state of the art to which the disclosure pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations. For example, the implementations are described with reference to a tee pipe fitting. However, the disclosure can be implemented with any appropriate pipe fitting that connects two or more pipes flowing fluids of different pressures.

That which is claimed is:
1. A sensor assembly communicatively coupled to a processing device, the sensor assembly configured to be disposed within and move along a pipe configured to flow a fluid, the sensor assembly comprising:

a tubular housing configured to be centrally retained within the pipe, the tubular housing comprising an outer diameter smaller than an internal diameter of the pipe;

a plurality of ultrasonic elements coupled to and distributed evenly along an external surface of the tubular housing to define a gap between an outer surface of the ultrasonic elements and an internal surface of the pipe, the ultrasonic elements configured to transmit ultrasonic signals and sense ultrasonic signals reflected from the internal surface of the pipe to sense corrosion and scale buildup information inside the pipe, the ultrasonic elements configured to transmit the information to the processing device; and a centering disc coupled to a first end of the tubular housing, the centering disc comprising an outer diameter configured to span the internal diameter of the pipe, the centering disc defining an internal fluid channel configured to receive fluid from the pipe as the sensor assembly moves along the pipe and direct the fluid to the gap between the ultrasonic elements and the internal surface of the pipe to form a tubular fluid column of laminar flow that fluidically couples the ultrasonic elements with an internal surface of the pipe.

2. The sensor assembly of claim 1, further comprising:
a second centering disc coaxially coupled to a second end of the tubular housing opposite the first end, the second centering disc having an outer diameter similar to the first centering disc, the second centering disc comprising an internal fluid channel configured to receive, as the sensor assembly moves along the pipe, the fluid from the tubular fluid column and configured to direct the fluid to an outlet of the second centering disc.

3. The sensor assembly of claim 2, wherein the centering discs are detachable from the tubular housing, and wherein the tubular housing is attachable to centering discs of different sizes to fit within pipes of different internal diameters.

4. The sensor assembly of claim 2, wherein each of the centering discs comprise a compliant outer surface conformable to surface variations of the internal surface of the pipe.

5. The sensor assembly of claim 1, wherein the sensor assembly is configured to sense corrosion and scale buildup information of at least one of the internal surface of the pipe, an external surface of the pipe, and external fins of the pipe.

6. The sensor assembly of claim 5, wherein the ultrasonic elements are configured to sense corrosion and scale buildup information of the external surface of the pipe and to sense damage information of the external fins of the pipe by sensing ultrasonic signals reflected back from an interface between two dissimilar materials.

7. The sensor assembly of claim 1, wherein the sensor assembly is configured to sense thermal fatigue cracking at an external surface of the pipe by steering a direction of the ultrasonic signals transmitted by the ultrasonic elements to travel in a non-orthogonal direction with respect to an external surface of the ultrasonic elements.

8. The sensor assembly of claim 1, wherein the processing device is configured to generate, based on the information, a time of flight curve representing a presence or absence of corrosion and scale buildup along the pipe.

9. The sensor assembly of claim 8, wherein the processing device comprises a display device configured to display a user interface, the processing device configured to perform ultrasonic data acquisition associated with pipes, the display device configured to display, in the user interface, the time of flight curve generated by the processing device.

10. The sensor assembly of claim 1, wherein the sensor assembly is electrically coupled to a rotating cleaning brush configured to clean an interior diameter of the pipe to prepare the pipe to be inspected by the sensor assembly.

11. A system comprising:
a processing device; and
a sensor assembly communicatively coupled to a processing device, the sensor assembly configured to be disposed within and move along a pipe configured to flow a fluid, the sensor assembly comprising:
a tubular housing configured to be centrally retained within the pipe, the tubular housing comprising an outer diameter smaller than an internal diameter of the pipe;
a plurality of ultrasonic elements coupled to and distributed evenly along an external surface of the tubular housing to define a gap between an outer surface of the ultrasonic elements and an internal surface of the pipe, the ultrasonic elements configured to transmit ultrasonic signals and sense ultrasonic signals reflected from the internal surface of the pipe to sense corrosion and scale buildup information inside the pipe, the ultrasonic elements configured to transmit the information to the processing device; and
a centering disc coupled to a first end of the tubular housing, the centering disc comprising an outer diameter configured to span the internal diameter of the pipe, the centering disc defining an internal fluid channel configured to receive fluid from the pipe as the sensor assembly moves along the pipe and direct the fluid to the gap between the ultrasonic elements and the internal surface of the pipe to form a tubular fluid column of laminar flow that fluidically couples the ultrasonic elements with an internal surface of the pipe.

12. The system of claim 11, wherein the sensor assembly further comprises:
a second centering disc coaxially coupled to a second end of the tubular housing opposite the first end, the second centering disc having an outer diameter similar to the first centering disc, the second centering disc comprising an internal fluid channel configured to receive, as the sensor assembly moves along the pipe, the fluid from the tubular fluid column and configured to direct the fluid to an outlet of the second centering disc.

13. The system of claim 11, wherein the sensor assembly is configured to sense corrosion and scale buildup information of at least one of the internal surface of the pipe, an external surface of the pipe, and external fins of the pipe.

14. The system of claim 11, wherein the processing device is communicatively coupled to a memory storying instructions that, when executed by the processing device, cause the processing device to generate, based on the received information from the sensor assembly, a time of flight curve representing a presence or absence of corrosion and scale buildup along the pipe.

15. The system of claim 14, wherein the processing device comprises a display device configured to display a user interface, the processing device configured to perform ultrasonic data acquisition associated with pipes, the display device configured to display, in the user interface, the time of flight curve generated by the processing device.

16. A method comprising:
receiving, by a processing device and from a sensor assembly communicatively coupled to the processing device, corrosion and scale buildup information about an internal surface of a pipe, the sensor assembly disposable within and movable along the pipe configured to flow a fluid, the sensor assembly comprising:
- a tubular housing configured to be centrally retained within the pipe, the tubular housing comprising an outer diameter smaller than an internal diameter of the pipe,
- a plurality of ultrasonic elements coupled to and distributed evenly along an external surface of the tubular housing to define a gap between an outer surface of the ultrasonic elements and an internal surface of the pipe, the ultrasonic elements configured to transmit ultrasonic signals and sense ultrasonic signals reflected from the internal surface of the pipe to sense corrosion and scale buildup information inside the pipe, the ultrasonic elements configured to transmit the information to the processing device, and
- a centering disc coupled to a first end of the tubular housing, the centering disc comprising an outer diameter configured to span the internal diameter of the pipe, the centering disc defining an internal fluid channel configured to receive fluid from the pipe as the sensor assembly moves along the pipe and direct the fluid to the gap between the ultrasonic elements and the internal surface of the pipe to form a tubular fluid column of laminar flow that fluidically couples the ultrasonic elements with an internal surface of the pipe; and determining, based on the received information, a location of scale formation or corrosion in the pipe.

17. The method of claim 16, wherein determining the location of scale formation or corrosion in the pipe comprises determining a value representative of an amount of corrosion or scale buildup in the pipe.

18. The method of claim 16, further comprising generating, by the processing device and based on the received information from the sensor assembly, a time of flight curve representing a presence or absence of corrosion and scale buildup along the pipe.

19. The method of claim 18, wherein the processing device comprises a display device configured to display a user interface, and wherein the method further comprises:
- performing, by the processing device, ultrasonic data acquisition associated with pipes, and
- displaying, by the processing device on the display device, the time of flight curve generated by the processing device.

20. The method of claim 16, wherein the sensor assembly is configured to sense corrosion and scale buildup information of at least one of the internal surface of the pipe, an external surface of the pipe, and external fins of the pipe, and wherein receiving the information comprises receiving corrosion and scale buildup information of at least one of the internal surface of the pipe, the external surface of the pipe, and the external fins of the pipe.

21. The sensor assembly of claim 1, wherein the processing device disposed outside the sensor assembly, the ultrasonic elements configured to transmit the information to the processing device through a cable extending from the sensor assembly, through an outlet of the pipe, to the processing device.

22. The sensor assembly of claim 1, wherein the plurality of ultrasonic elements cover an entire circumference of the tubular housing.

* * * * *